H. L. SMITH AND H. L. SMITH, Jr.
APPARATUS FOR SHELLING NUTS.
APPLICATION FILED JULY 21, 1921.

1,418,840.

Patented June 6, 1922.
3 SHEETS—SHEET 1.

INVENTORS
Horace L. Smith
Horace L. Smith, Jr.
Ogle R. Singleton,
ATTORNEY

H. L. SMITH AND H. L. SMITH, Jr.
APPARATUS FOR SHELLING NUTS.
APPLICATION FILED JULY 21, 1921.

1,418,840.

Patented June 6, 1922.
3 SHEETS—SHEET 2.

INVENTORS
Horace L. Smith
Horace L. Smith, Jr.
Ogle R. Singleton
ATTORNEY

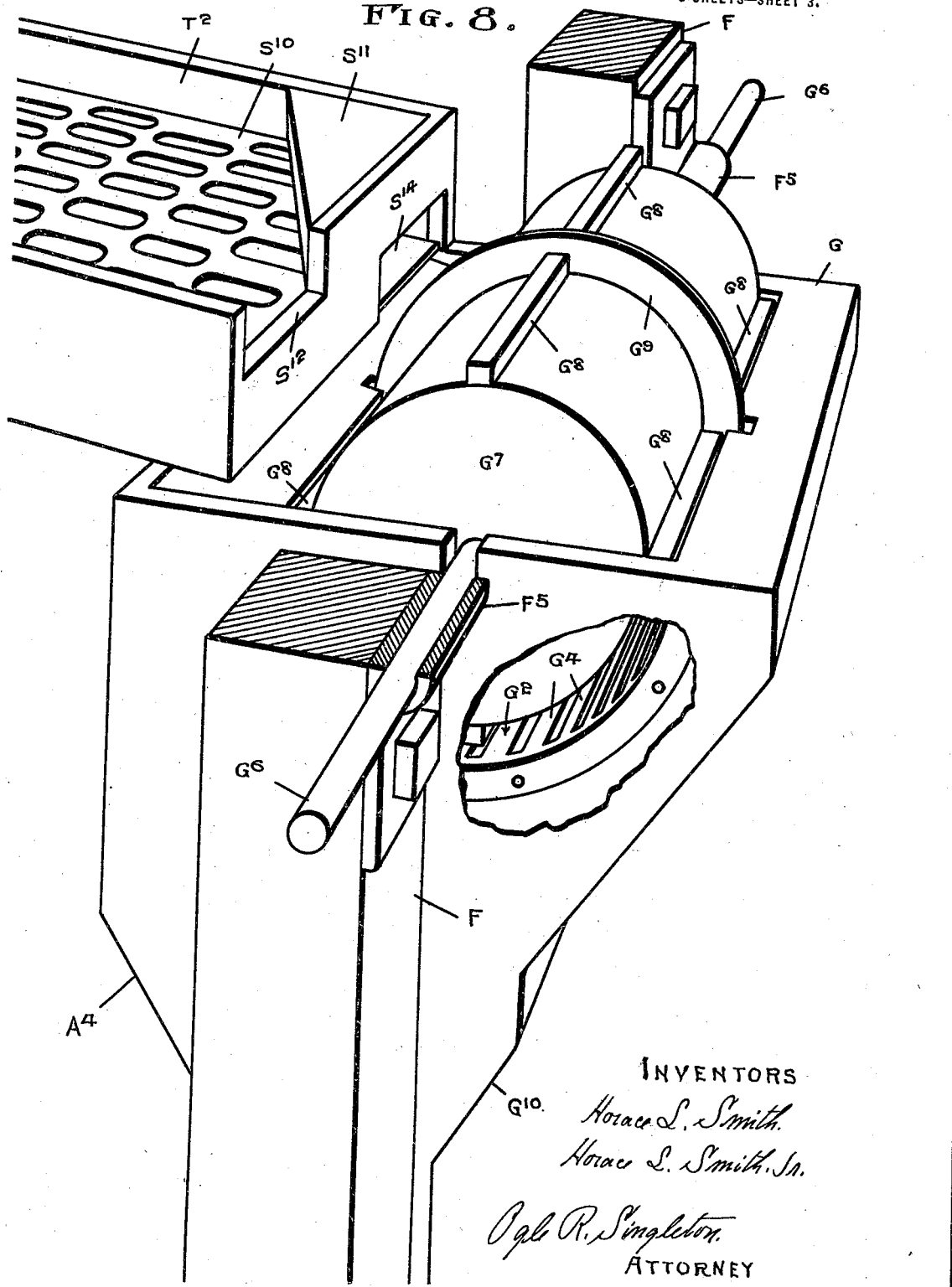

UNITED STATES PATENT OFFICE.

HORACE L. SMITH AND HORACE L. SMITH, JR., OF PRINCE GEORGE COUNTY, VIRGINIA.

APPARATUS FOR SHELLING NUTS.

1,418,840.

Specification of Letters Patent.  Patented June 6, 1922.

Application filed July 21, 1921. Serial No. 486,475.

*To all whom it may concern:*

Be it known that we, HORACE L. SMITH and HORACE L. SMITH, Jr., citizens of the United States, residing in the county of Prince George and State of Virginia, have invented certain new and useful Improvements in Apparatus for Shelling Nuts, of which the following is a specification.

Our invention consists in a new and useful method of and apparatus for shelling nuts. It is designed more particularly for use in shelling peanuts and is of especial value when such shelling is to provide peanuts for planting.

It is a well known fact that peanuts to be of any value as seed must have the skins enclosing the kernels entirely unbroken. It is equally well known that the usual method of shelling peanuts by any means other than by hand shelling causes this skin to become bruised or broken, thus rendering the nuts unfit for use as seed. For this reason it has heretofore been impossible to satisfactorily shell peanuts for planting in any way other than by hand, which is an extremely laborious and time-consuming method, which at the present time is extremely costly.

The obvious difficulty incident to the present method of shelling peanuts by mechanical means is the variation in the size of the shell relative to the crushing members in the shelling mechanism. When the nuts are passed between the shelling members which must of necessity be in fixed relation, nuts which are unduly large are so crushed that the skin within the shell is broken or severely bruised, and nuts which are unduly small pass between the shelling members without having their shells broken. The result of this method is unsatisfactory shelling since the whole mass of nuts pass from the shelling mechanism containing many nuts with damaged skins and many unshelled nuts. It will be seen that any efforts directed to the adjustment of the shelling members will be unavailing to correct both of these faults, since if the space between the shelling members is increased to prevent the breaking of the skins of the large nuts an even larger share of nuts will pass through unshelled, while if the space is reduced the number of nuts with damaged skins will be increased.

Our improved method contemplates the requisite grading of the nuts in accordance with their sizes and the subsequent simultaneous shelling of the various sizes, so that the shells of the nuts of each size will be satisfactorily removed without breaking the skins. Our method may be practiced to accomplish the desired result in a series of intimately related operations by which the whole mass of peanuts of varied sizes may be shelled without breaking the skins, and the shelled nuts satisfactorily delivered at a common point.

We have indicated in the drawings filed herewith one form of apparatus which illustrates the practice of our improved method, but it is to be clearly understood that our method may be practiced by a wide variety of means, and our claim to novelty extends to the improved method as well as the preferred form of apparatus hereinafter fully described.

In the drawings:

Fig. 8 is a perspective view of the sheller.

Figure 1:
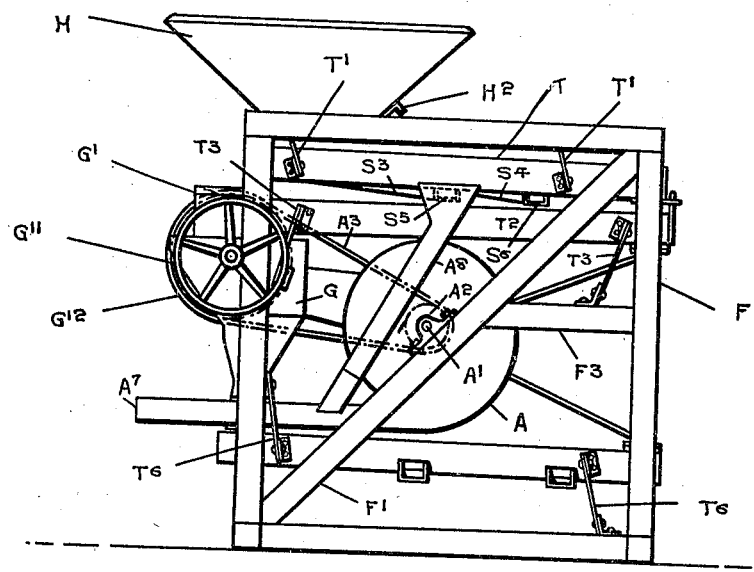
Fig. 1 is a side elevation of our apparatus.
Figure 2:
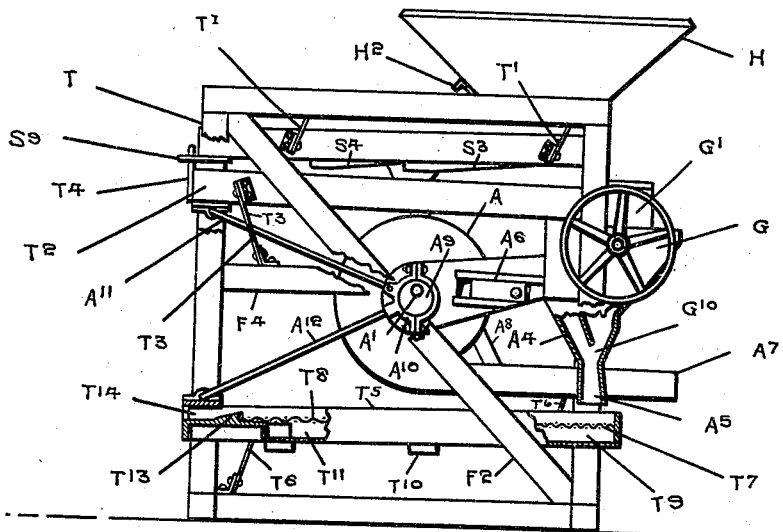
Fig. 2 is another side elevation showing the opposite side.
Figure 3:
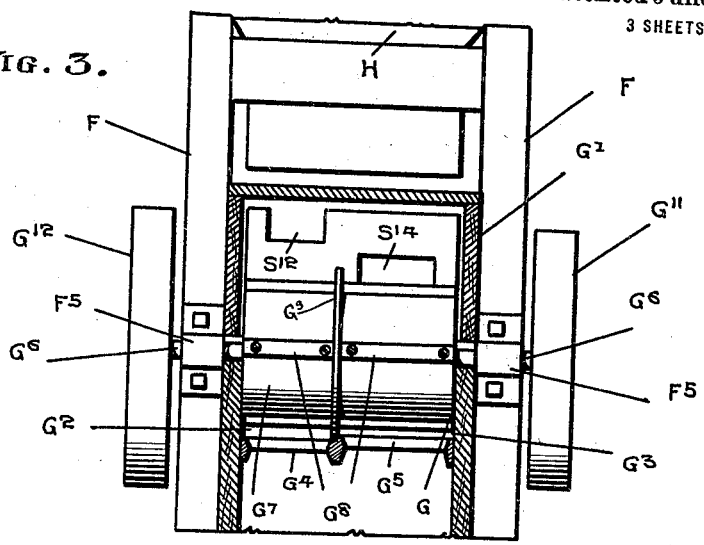
Fig. 3 is a transverse vertical section through the shelling mechanism.
Figure 4:
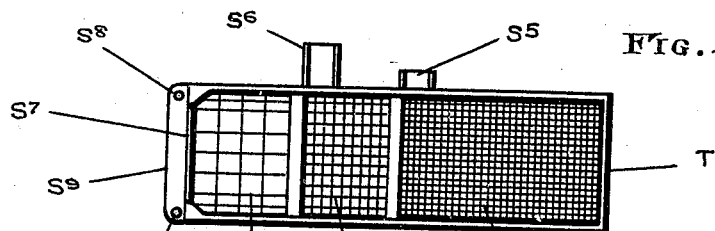
Fig. 4 is a plan view of the screening tray.
Figure 5:
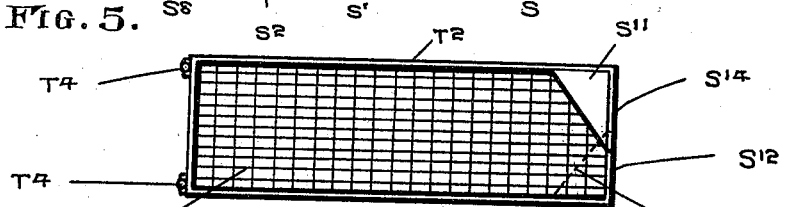
Fig. 5 is a plan view of the grading tray.
Figure 6:
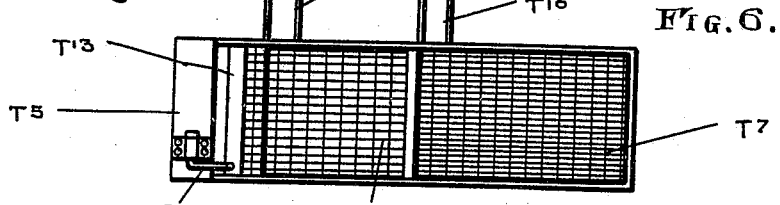
Fig. 6 is a plan view of a second screening tray.
Figure 7:
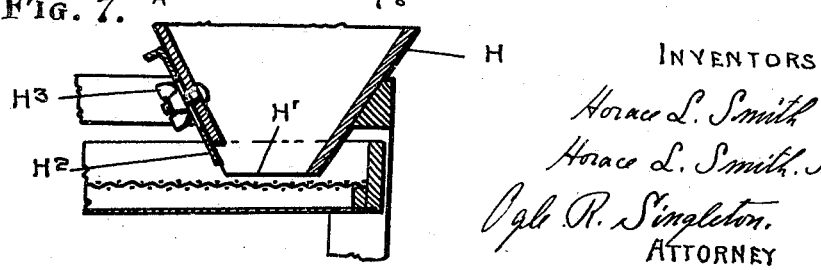
Fig. 7 is a vertical section of the hopper.

Our improved shelling apparatus is mounted in a suitable frame F of any ordinary form of construction, provided with two diagonal struts F—1 and F—2, horizontal cross braces F—3 and F—4 being disposed between the struts F—1, F—2 and the sides of the frame F. A hopper H is placed upon the top of the frame F at one end, and is provided with a discharge opening H—1 in its bottom, which is provided on one side with a sliding valve H—2 which may be fixed in adjusted position by means of a wing nut H—3.

Endwise swingably disposed beneath the hopper H is a tray T suspended by spring straps T—1 bolted to the tray T and the frame F. The tray T is so disposed that one end is directly beneath the opening H—1 and the tray T is slightly wider than the length of the opening H—1. The tray T is slightly inclined downwardly from its end beneath the hopper H. In the bottom of the tray T there is a screen having three portions of differing mesh. The first portion S at the end of the tray T beneath the hopper H is of fine mesh, the second portion S—1 in the middle of the tray T is of an average mesh and the third portion S—2 at the lower end of the tray T of a coarse mesh. The tray T is provided with a closed compartment S—3 below the portion S and a closed compartment S—4 below the portion S—1, which are provided respectively with discharge openings S—5 and S—6. The end of the tray T adjacent portion S—2 is provided with the discharge opening S—7.

A second tray T—2 is supported beneath tray T by spring straps T—3 bolted to the tray T—2 and the cross braces F—3, F—4 and the shelling mechanism G. This tray T—2 is slightly inclined downwardly reversely to the tray T, and is provided at its end adjacent tray T with two upwardly projecting pins T—4, T—4 which are vertically slidable through openings S—8, S—8 in plate S—9 attached to the tray T. The tray T—2 is divided into an upper and lower compartment by a screen S—10. The upper compartment is provided at the lower end of the tray T—2 with a slanting guide plate S—11 adjacent its discharge opening S—12, which is disposed toward one side of the end of the tray T—2, and the lower compartment is provided at the lower end of the tray T—2 with a slanting guide plate S—13 adjacent the discharge opening S—14 toward the opposite side of the end of the tray T—2.

Located beneath the openings S—12, S—14 in the ends of the compartments of the tray T—2, is the casing G containing the shelling mechanism, which has a cover G—1 into which is received the end of the tray T—2. Two semi-circular concaves G—2, G—3 are disposed in the casing G, formed of shelling bars G—4, G—5 respectively. These concaves G—2, G—3 are so disposed relative to the tray T—2, that the concave G—2 is beneath the opening S—12 and the concave G—3 is beneath the opening S—14. The radius of the concave G—2 is greater than that of the concave G—3. The shaft G—6 is concentrically mounted relative to the concaves G—2, G—3, in suitable bearings F—5, F—5, on the frame F. Carried upon this shaft G—6 is the rotary shelling member G—7 provided upon its periphery with the blades G—8 adapted to co-act with the concaves G—2, G—3. The blades G—8 are disposed parallel to the shaft G—6 and at uniform distance from said shaft. By reason of the disparity of the radii of the concaves G—2, G—3 it will be seen that greater space is afforded between the blades G—8 and the shelling bars G—4 of the concave G—2, than is afforded between the blades G—8 and the shelling bars G—5 of the concave G—3. A circular disc G—9 surrounds the member G—7 in a vertical plane, and serves as a separator between the concaves G—2, G—3, thus dividing the casing G into two compartments above the concaves G—2 and G—3. Beneath the concaves G—2, G—3, the casing G is provided with a discharge opening G—10. A pulley G—11 is provided upon one end of the shaft G—7 by which power may be applied to the device.

A suction fan A is mounted on a shaft A—1 journaled on the struts F—1, F—2 and provided with a pulley A—2 connected by a belt A—3 with a pulley G—12 upon the shaft G—6. The fan A is provided with an intake conduit A—4 into the lower end of which the discharge opening G—10 opens. The open end A—5 of the conduit A—4 is directly below the opening G—10. The conduit A—4 is provided with a valve A—6. The fan A is provided with a discharge conduit A—7. A discharge chute A—8 communicates with the discharge conduit A—7 and has its upper open end adapted to receive material discharged through the opening S—5 in the tray T.

Beneath the opening A—5, there is disposed a swingable tray T—5 supported upon spring straps T—6 bolted to the tray T—5 and the frame F. The tray T—5 is slightly inclined downwardly from its end beneath the opening A—5. The tray T—5 is provided with a screen T—7 having a mesh somewhat finer than that of the screen S—10 and a second screen T—8 having a somewhat coarser mesh. A compartment T—9 is provided in the tray T—5 under the screen T—7 having a discharge opening T—10, and a compartment T—11 is provided in the tray T—5 under the screen T—8 having a discharge opening T—12. A guard plate T—13 is provided across the lower edge of the screen T—8. The tray T—5 is provided at its lower end with a discharge opening T—14.

The shaft A—1 is provided with an eccentric cam A—9 which oscillates the collar A—10 thereon which is connected by the link A—11 to the tray T—2. The collar A—10 is also connected by the link A—12 to the tray T—5. It will be obvious that the rotation of the shaft A—1 causes the reciprocation of the trays T—2 and T—5, and by reason of their mounting on the spring straps T—3 and T—6 respectively these trays are caused to rise and fall as they are reciprocated. The pin and slot connection between the trays T and T—2 causes the tray T to be reciprocated in unison with the tray T—2, but owing to the relative disposition of the spring straps T—1 and T—3 the trays T and T—2 are caused to approach and recede as they are reciprocated.

The operation of our preferred form of apparatus whereby our novel method is practiced is as follows:

Peanuts of various sizes, as they come from the thrasher, are placed in the hopper H. The valve H—2 is properly adjusted, and power being applied to the pulley G—11, the tray T is caused to reciprocate, thus causing the peanuts to be discharged from the hopper H into the tray T. By reason of the inclination and reciprocation of the tray T, the peanuts pass over the screen S. The smaller openings in the screen S permitting any dirt or small particles to pass through the screen S and into the compartment S—3 in the bottom of the tray T, from which compartment such refuse may be discharged through the discharge opening S—5, being sucked through the chute A—8 into the discharge conduit A—7. Since the holes in the screen S encountered by the peanuts are small, only dirt and small particles are admitted therethrough and the peanuts pass on to the screen S—1 which is provided with holes of sufficient size to permit any broken nuts to pass through into the compartment S—4, from which they are discharged through the opening S—6. The unshelled peanuts pass through screen S—2 and fall into the tray T—2. Any sticks, vines, or other refuse passing through tray T are not permitted to pass through the screen S—2 but pass out of the tray T at the discharge opening S—7 at the lower end of the tray T.

The peanuts falling into the tray T—2 are received upon the screen S—10 which is provided with holes so designed as to allow all nuts below a certain size to pass therethrough. These nuts are received into the lower compartment of the tray T—2, while the remaining nuts of a size too large to be admitted through the holes in the screen S—10 remain in the upper compartment of the tray T—2. Owing to the inclination and reciprocation of the tray T—2, the peanuts in both compartments are caused to travel to the lower end of the tray T—2 where they are guided by the guide-plates S—11 and S—13 in the two compartments to the discharge openings S—12 and S—14. The smaller nuts in the lower compartment issuing through the discharge opening S—14 pass through the cover G—1 and are received between the concave G—3 and the shelling member G—7. The larger nuts in the upper compartment issuing through the discharge opening S—12 pass through the cover G—1 and are received between the concave G—2 and the shelling member G—7. The disc G—9 effectually separates the nuts received upon the two concaves G—2 and G—3.

Power having been applied to the pulley G—11, the shelling member G—7 is caused to rotate.

The space between the concave G—2 and the blades G—8 of the shelling member G—7 is so designed relative to the size of the mesh of the screen S—2 that the nuts received into this space will have their shells cracked but will not have their skins broken by the action of the blades G—8 and the shelling bars G—4 of the concave G—3. In like manner, the space between the concave G—3 and the blades G—8 of the shelling member G—7 is so designed relative to the size of the holes in the screen S—10 that the nuts received into this space will have their shells cracked but will not have their skins broken by the action of the blades G—8 and the shelling bars G—5 of the concave G—3.

After the shelling operation, the nuts and cracked shells pass through the concaves G—2 and G—3 and commingle in the bottom of the shelling mechanism G, whence they pass through the discharge opening G—10 into the intake conduit A—4.

The rotation of the shaft A—1 causes the fan A to create a suction draft through the intake conduit A—4 which is sufficient to draw the broken shells and refuse from the mass entering the intake conduit A—4 from the shelling mechanism G. The valve A—6 is provided for the purpose of regulating the force of the suction draft in the conduit A—4. These shells and refuse are drawn into the fan A and blown through the discharge conduit A—7. The weight of the shelled nuts is sufficient to overcome the effect of the suction draft and the nuts fall through the open end A—5 of the intake conduit A—4 and are received upon the screen T—7 in the tray T—5. Due to the inclination and reciprocation of the tray T—5 the shelled nuts are caused to pass along the screen T—7. The holes in this screen T—7 are so designed as to allow any broken nuts or small particles of refuse to pass therethrough into the compartment T—9 and be discharged through the opening T—10. The screened, shelled nuts pass through the screen T—8 into the compartment T—11 and are discharged through the opening T—12. Any shells or other refuse in the tray T—5 pass out through the opening T—14 in the lower end of the tray T—5. The abutment T—13 prevents the shelled nut from escaping through the opening T—14.

As respects our process it is obvious that the details of the special apparatus which we prefer and claim are not necessary to the carrying out of the process, however well adapted they may be for that purpose.

And it must also be understood that the details of our apparatus may be altered as desired to practice our process in the most satisfactory manner. For example, the number of grading trays may vary and a corresponding variation obtain in the number of shelling concaves. The details of construction herein set forth illustrate only one embodiment of an apparatus designed to practice our process, and we refer for the scope of our invention to the claims appended hereto.

Having described our invention, what we claim is:

1. In an apparatus for shelling nuts, the combination of means adapted to separate the nuts into classes in accordance with their sizes; two shelling concaves, each adapted to receive the nuts of a single class; a shelling member adapted to co-act with both of said concaves; and a circular plate projecting beyond the periphery of said member and between said concaves, adapted to separate the nuts on one concave from the nuts on the other concave.

2. In an apparatus for shelling nuts, the combination of means adapted to separate the nuts into classes in accordance with their sizes; two shelling concaves, each adapted to receive the nuts of a single class; a cylindrical shelling member adapted to co-act with both of said concaves; and a circular plate surrounding said member and adapted to separate the nuts on one concave from the nuts on the other concave.

3. In an apparatus for shelling nuts, the combination of a hopper; a tray adapted to receive nuts from said hopper and provided with a plurality of compartments, each provided with a discharge port; a screen in said tray adapted to grade the nuts in accordance with their sizes and thereby determine their admission to the several compartments; a shelling chamber; and a shelling member in said chamber provided with separating means adapted to form a plurality of compartments in said chamber, each of said compartments being adjacent one of said ports and adapted to receive the nuts from its adjacent port.

4. In an apparatus for shelling nuts, the combination of a shelling chamber; a crushing roller of uniform diameter mounted for rotation in said chamber; a plurality of crushing concaves of differing radii mounted in said chamber concentric with said roller; a grading tray; a plurality of compartments in said tray; a discharge port in each compartment adapted to discharge nuts from said compartment between one of said concaves and said roller; and a grading screen associated with each compartment adapted to regulate the admission of nuts into its compartment, the mesh of each screen being determined by the space between the roller and the concave receiving the nuts from the compartment.

In testimony whereof we affix our signatures.

HORACE L. SMITH.
HORACE L. SMITH, Jr.